(12) United States Patent
Wang (10) Patent No.: US 12,166,392 B2
(45) Date of Patent: Dec. 10, 2024

(54) MATCHED CONTOUR WINDING OF COILS IN SLOT BETWEEN ADJACENT TEETH OF STATOR CORE AND PROCESSING METHOD THEREFOR

(71) Applicant: Siemens Aktiengesellschaft, Munich (DE)

(72) Inventor: Yu Ting Wang, Changzhou (CN)

(73) Assignee: Siemens Aktiengesellschaft, Munich (DE)

(*) Notice: Subject to any disclaimer, the term of this patent is extended or adjusted under 35 U.S.C. 154(b) by 655 days.

(21) Appl. No.: 17/265,545

(22) PCT Filed: Aug. 10, 2018

(86) PCT No.: PCT/CN2018/099996
§ 371 (c)(1),
(2) Date: Feb. 3, 2021

(87) PCT Pub. No.: WO2020/029257
PCT Pub. Date: Feb. 13, 2020

(65) Prior Publication Data
US 2021/0296953 A1 Sep. 23, 2021

(51) Int. Cl.
*H02K 1/16* (2006.01)
*H02K 3/12* (2006.01)
(Continued)

(52) U.S. Cl.
CPC .......... *H02K 3/12* (2013.01); *H02K 1/16* (2013.01); *H02K 3/48* (2013.01); *H02K 15/065* (2013.01)

(58) Field of Classification Search
CPC .......... H02K 3/12; H02K 1/16; H02K 3/48; H02K 15/065; H02K 3/28; H02K 2201/15; H02K 1/148; H02K 3/18; H02K 3/325
See application file for complete search history.

(56) References Cited

U.S. PATENT DOCUMENTS

| 6,741,009 B1 | 5/2004 | Ando et al. |
| 2004/0201303 A1 | 10/2004 | Zhang et al. |

(Continued)

FOREIGN PATENT DOCUMENTS

| CN | 1521916 A | 8/2004 |
| CN | 101218731 A | 7/2008 |

(Continued)

OTHER PUBLICATIONS

JP2005261117A English translation (Year: 2023).*

(Continued)

*Primary Examiner* — Terrance L Kenerly
*Assistant Examiner* — Viswanathan Subramanian
(74) *Attorney, Agent, or Firm* — Harness, Dickey & Pierce, P.L.C.

(57) ABSTRACT

An embodiment provides a stator core including a plurality of first single teeth, a plurality of second single teeth and coils. The teeth are I-shaped and each have a long side, a short side, a connection portion and a wire-accommodating slot located on the sides of the connection portion. The coils are wound around the connection portions and accommodated in the wire-accommodating slots. The stator core is an annular element formed by splicing first single teeth and second single teeth in sequence in a staggered manner into a circle, and winding modes of the coils on the first single teeth and the second single teeth are different, so that the contour of the coils located on the outer side of the wire-accommodating slots of the first single teeth is different from the contour of the coils located on the outer side of the wire-accommodating slots of the second single teeth.

11 Claims, 5 Drawing Sheets

(51) Int. Cl.
  *H02K 3/48* (2006.01)
  *H02K 15/06* (2006.01)

(56) References Cited

U.S. PATENT DOCUMENTS

| | | |
|---|---|---|
| 2013/0300247 A1 | 11/2013 | Tsuchiya et al. |
| 2015/0028715 A1 | 1/2015 | Akita et al. |
| 2018/0205271 A1* | 7/2018 | Miyoshi .................. H02K 3/522 |
| 2018/0226852 A1 | 8/2018 | Kitamura et al. |
| 2018/0351419 A1 | 12/2018 | Sakai et al. |

FOREIGN PATENT DOCUMENTS

| | | |
|---|---|---|
| CN | 103370856 A | 10/2013 |
| CN | 105958673 A | 9/2016 |
| CN | 107408859 A | 11/2017 |
| CN | 107994693 A | 5/2018 |
| CN | 108141082 A | 6/2018 |
| EP | 0613234 A1 | 8/1994 |
| EP | 2026447 A1 | 2/2009 |
| EP | 3211765 A1 | 8/2017 |
| JP | 2005117821 A | 4/2005 |
| JP | 2005261117 A | 9/2005 |
| JP | 2006353038 A | 12/2006 |
| JP | 2008167593 A | 7/2008 |
| KR | 20160044784 A | 4/2016 |
| WO | WO 2007077674 A1 | 7/2007 |

OTHER PUBLICATIONS

JP2008167593A English translation (Year: 2024).*
International Search Report PCT/ISA/210 and Written Opinion of the International Searching Authority PCT/ISA/237 for International Application No. PCT/CN2018/099996 dated Aug. 10, 2018.

* cited by examiner

Prior Art

MATCHED CONTOUR WINDING OF COILS IN SLOT BETWEEN ADJACENT TEETH OF STATOR CORE AND PROCESSING METHOD THEREFOR

PRIORITY STATEMENT

This application is the national phase under 35 U.S.C. § 371 of PCT International Application No. PCT/CN2018/099996 which has an International filing date of Aug. 10, 2018, which designated the United States of America, the entire contents of which are hereby incorporated herein by reference.

FIELD

Embodiments of the present invention generally relate to the field of motors, and in particular relate to a stator core and the processing method thereof.

BACKGROUND

To manufacture coils more conveniently and quickly, techniques for splicing single teeth into a circle or other structures making winding on single teeth convenient have been developed in current motor manufacturing.

Figure 1:
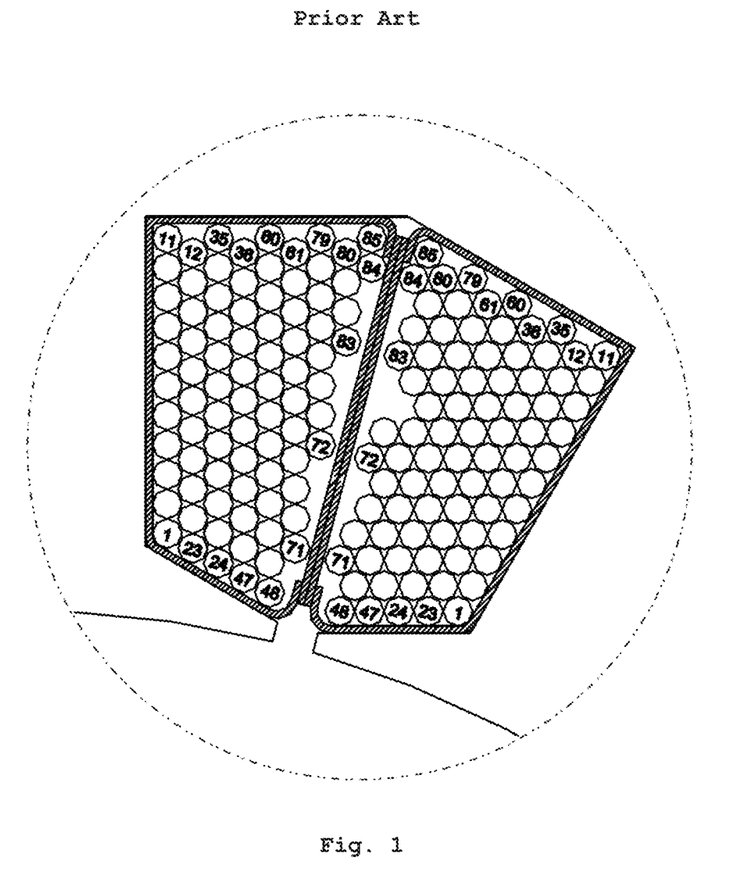
FIG. 1 is a partial view of two adjacent single teeth of the stator core of the prior art.

In the prior art, an annular stator core made by splicing single teeth into a circle consists of a plurality of single teeth. The winding modes of the windings on single teeth are basically consistent so that the cross-section position of each turn of coils on all single teeth is basically the same. For example, FIG. 1 is a partial view when two adjacent single teeth of the stator core of the prior art are spliced. In FIG. 1, the numbers 1 to 85 marked on the turns of the coils represent the winding sequence of each turn of the coils. Wherein, the coil arrangement in the wire-accommodating slot of the left single tooth is completely consistent with the coil arrangement in the wire-accommodating slot of the right single tooth, that is to say, they are symmetric to each other. In this way, a plurality of single teeth having completely the same coil arrangement are finally spliced into a circle to form the above-mentioned annular stator core.

SUMMARY

Compared with the wire embedding technique, this technique can increase the slot space factor of a motor. However, the inventors have discovered that a higher slot spacer factor is required in the trade.

In order to further increase the slot space factor on the basis of the techniques for splicing single teeth into a circle, at least one embodiment of the present invention provides a brand new stator core structure and the processing method thereof.

According to one embodiment of the present invention, a stator core is provided, the stator core comprises a plurality of first single teeth, a plurality of second single teeth and coils, the first single teeth and the second single teeth are I-shaped and each have a long side, a short side, a connection portion and a wire-accommodating slot located on the two sides of the connection portion, and the coils are formed by winding wires around the connection portions and are accommodated in the wire-accommodating slots, wherein, the stator core is an annular element formed by splicing first single teeth and second single teeth in sequence in a staggered manner into a circle, wherein, the winding mode of the coils on the first single teeth is different from the winding mode of the coils on the second single teeth so that the contour of the coils located on the outer side of the wire-accommodating slots of the first single teeth is different from the contour of the coils located on the outer side of the wire-accommodating slots of the second single teeth. The staggered arrangement and the inconsistent contours of the coils located on the outer side can further increase the slot space factor of a motor.

According to another embodiment of the present invention, a processing method of a stator core is provided and the method comprises:

winding coils on a plurality of first single teeth in first winding mode, winding coils on a plurality of second single teeth in second winding mode, wherein the first winding mode is different from the second winding mode and the contour of the coils located on the outer side of the first single teeth is different from the contour of the coils located on the outer side of the second single teeth, and splicing first single teeth and second single teeth in sequence in a staggered manner into a circle to form an annular stator core.

It should be understood that the above general description and the following detailed description of the present invention are both example and illustrative and are aimed at providing a further explanation to the present invention as claimed in the claims.

BRIEF DESCRIPTION OF THE DRAWINGS

The attached drawings provide a further understanding of the present invention and they are included in the present application and constitute a part of the present application. The attached drawings show the embodiments of the present invention and explain together with the description the principle of the present invention. In the drawings.

DESCRIPTION OF REFERENCE NUMERALS IN THE DRAWINGS

10 Stator core
11 First single teeth
12 Second single teeth
13 Coil
14 Insulating spacer
15 Insulating layer
111, 121 Long side
112, 122 Short side
113, 123 Connection portion
114, 124 Wire-accommodating slot

DETAILED DESCRIPTION OF THE EXAMPLE EMBODIMENTS

According to one embodiment of the present invention, a stator core is provided, the stator core comprises a plurality of first single teeth, a plurality of second single teeth and coils, the first single teeth and the second single teeth are I-shaped and each have a long side, a short side, a connection portion and a wire-accommodating slot located on the two sides of the connection portion, and the coils are formed by winding wires around the connection portions and are accommodated in the wire-accommodating slots, wherein, the stator core is an annular element formed by splicing first single teeth and second single teeth in sequence in a staggered manner into a circle, wherein, the winding mode of the coils on the first single teeth is different from the winding mode of the coils on the second single teeth so that the contour of the coils located on the outer side of the wire-accommodating slots of the first single teeth is different from the contour of the coils located on the outer side of the wire-accommodating slots of the second single teeth. The staggered arrangement and the inconsistent contours of the coils located on the outer side can further increase the slot space factor of a motor.

According to one embodiment of the present invention, in the above-mentioned stator core, the contour of the coils located on the outer side of the wire-accommodating slots of the first single teeth matches the contour of the coils located on the outer side of the wire-accommodating slots of the second single teeth. The mutual matching can more fully utilize the space of the joint part of the wire-accommodating slots of adjacent single teeth to increase the slot space factor.

According to one embodiment of the present invention, in the above-mentioned stator core, the difference between the winding mode of the coils on the first single teeth and the winding mode of the coils on the second single teeth is only that the winding mode of a plurality of turns of the coils located on the outermost side of the wire-accommodating slots of the first single teeth is different from the winding mode of a plurality of turns of the coils located on the outermost side of the wire-accommodating slots of the second single teeth. The winding modes can achieve the technical effects of the present invention by changing little the procedure of the established coiling equipment.

According to one embodiment of the present invention, in the above-mentioned stator core, an insulating layer is attached onto the slot walls of the wire-accommodating slots of the first single teeth and the second single teeth so that the first single teeth and the second single teeth are electrically insulated from the coils thereon.

According to one embodiment of the present invention, in the above-mentioned stator core, an insulating spacer is provided between adjacent first single teeth and second single teeth, the length of the insulating spacer is greater than the width of the slot opening of the wire-accommodating slots, and the insulating spacer is made of a flexible material. The flexible insulating spacer can be bent somewhat along the contour of the coils to achieve a better insulation effect.

According to one embodiment of the present invention, in the above-mentioned stator core, the first single teeth and the second single teeth are formed by laminating a plurality of layers of silicon steel sheets.

According to another embodiment of the present invention, a processing method of a stator core is provided and the method comprises:

winding coils on a plurality of first single teeth in first winding mode, winding coils on a plurality of second single teeth in second winding mode, wherein the first winding mode is different from the second winding mode and the contour of the coils located on the outer side of the first single teeth is different from the contour of the coils located on the outer side of the second single teeth, and splicing first single teeth and second single teeth in sequence in a staggered manner into a circle to form an annular stator core.

According to one embodiment of the present invention, in the above-mentioned method, the difference between the first winding mode and the second winding mode is only that the winding mode of a plurality of turns of the coils located on the outer side of the first single teeth is different from the winding mode of a plurality of turns of the coils located on the outer side of the second single teeth.

According to one embodiment of the present invention, in the above-mentioned method, before the step of winding coils, the processing method further comprises: attaching an insulating layer onto the slot walls of the wire-accommodating slots of the first single teeth and/or second single teeth.

According to one embodiment of the present invention, in the above-mentioned method, in the step of splicing first single teeth and second single teeth in sequence in a staggered manner into a circle to form an annular stator core, the processing method further comprises:

providing an insulating spacer between adjacent first single teeth and second single teeth, wherein the length of the insulating spacer is greater than the width of the slot opening of the wire-accommodating slots of the first single teeth and second single teeth and the insulating spacer is made of a flexible material.

Now the embodiments of the present invention are described in detail by reference to the drawings. Now, the preferred embodiments of the present invention are referred to in detail and the examples of the preferred embodiments are shown in the drawings. In any possible case, the same reference numeral or symbol is used to represent the same or similar part in all the drawings. In addition, although the terms used in the present invention are selected from common and known terms, some terms mentioned in the description of the present invention may be selected by the applicant according to his or her judgment and the detailed meanings are described in related parts of the document. In addition, it is required that the present invention should be understood not only according to the actual terms used, but also according to the meaning each term implies.

Figure 2:
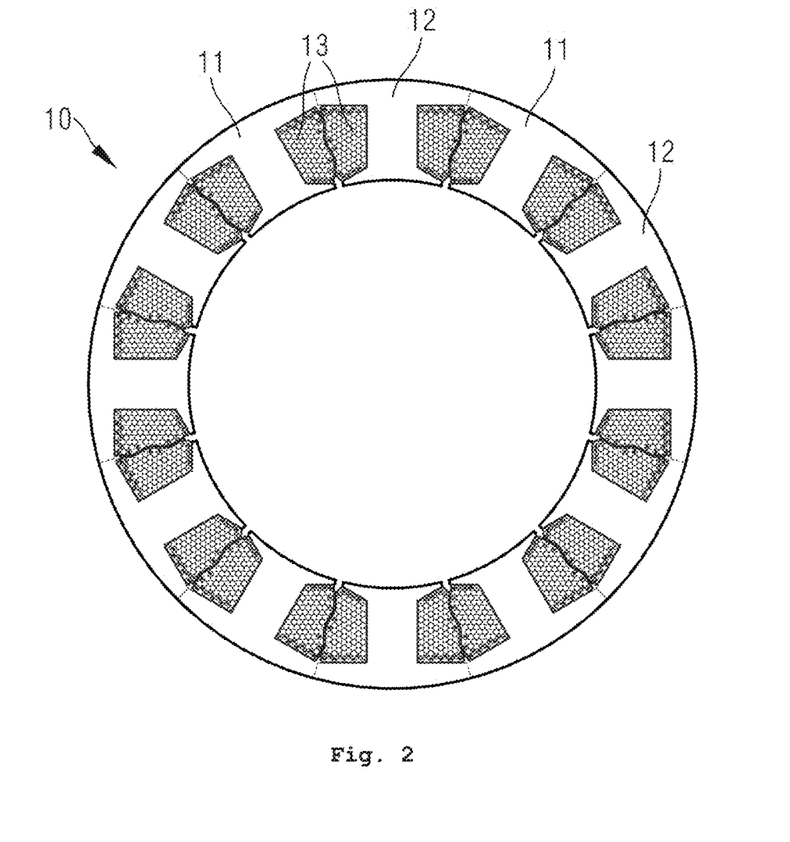
FIG. 2 is a view of one embodiment of the stator core according to the present invention.

The fundamental and the preferred embodiments of the present invention are discussed in detail by reference to the drawings. To increase the slot space factor, the conception of the present invention is that different designs are made for the coil arrangements on adjacent single teeth so that the number of turns which can be wound can be increased as much as possible. As shown in FIG. 2, the stator core 10 provided by the present invention mainly comprises a plurality of first single teeth 11, a plurality of second single teeth 12 and coils 13. First single teeth 11 and second single teeth 12 are formed by laminating a plurality of layers of silicon steel sheets. For example, the stator core 10 in the embodiment shown in this figure has 6 first single teeth 11 and 6 second single teeth 12. In addition, the stator core 10 is an annular element formed by splicing first single teeth and second single teeth in sequence in a staggered manner into a circle. In other words, the stator core 10 is formed by arranging a first single tooth and a second single tooth in a staggered manner, as shown in FIG. 2.

Figure 3:
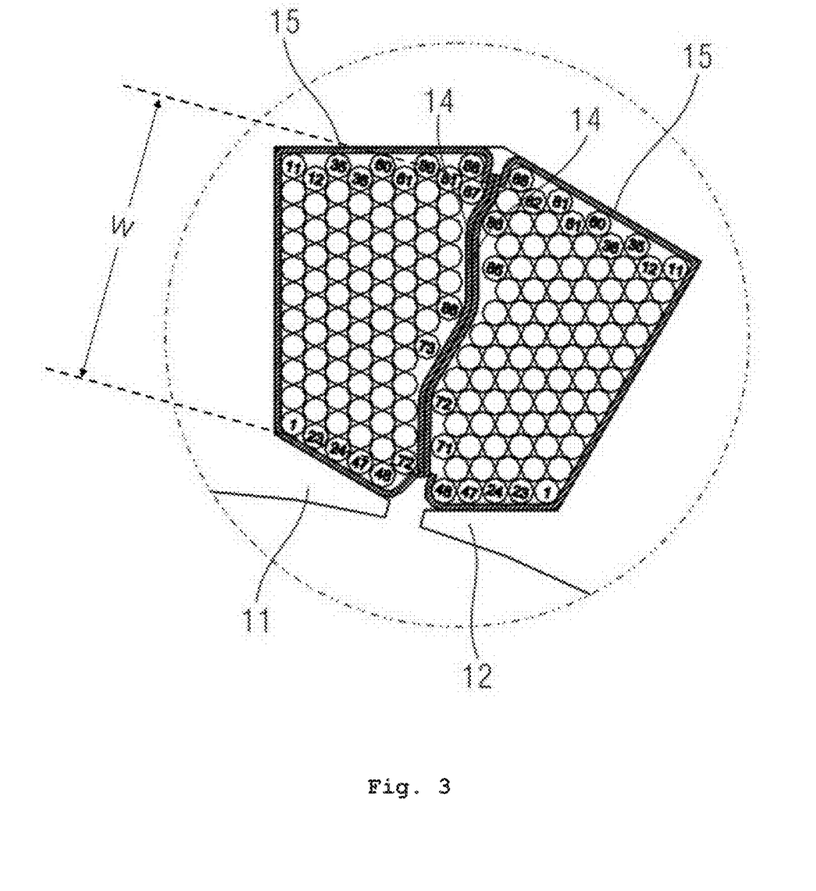
FIG. 3 is a partial view of two adjacent single teeth in the embodiment shown in FIG. 2.
Figure 4:
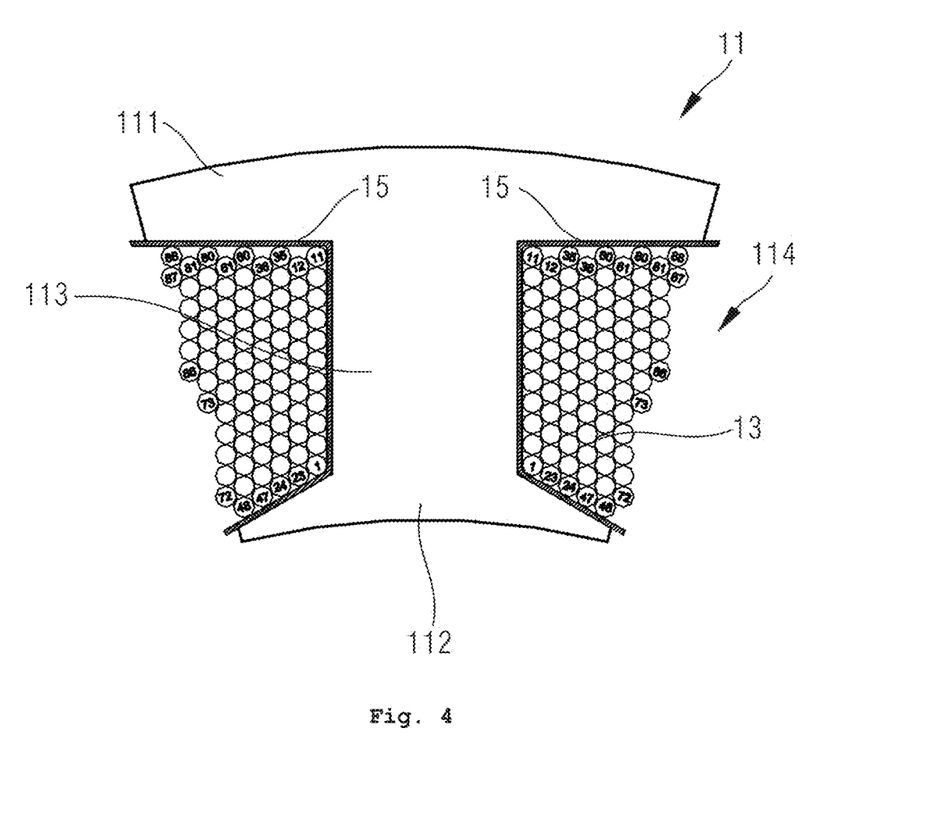
FIG. 4 shows the winding mode of coils on first single teeth in the embodiment shown in FIG. 2.
Figure 5:
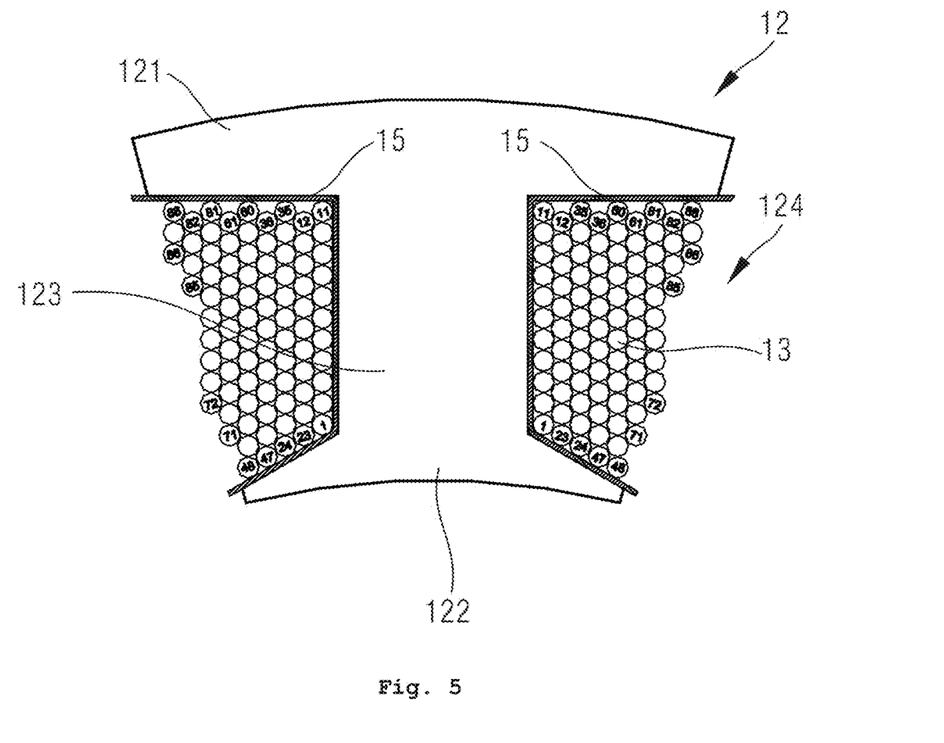
FIG. 5 shows the winding mode of coils on second single teeth in the embodiment shown in FIG. 2.

In addition, as further shown in FIGS. 4 and 5, the shapes of first single teeth 11 and second single teeth 12 are basically the same, that is to say, they all are I-shaped and have a long side 111, 121, a short side 112, 122, a connection portion 113, 123 and a wire-accommodating slot 114, 124 located on the two sides of the connection portion. The connection portion 113, 123 is connected between the long side 111, 121 and the short side 112, 122 to form the I-shape shown in FIGS. 4 and 5. The coils 13 are formed by winding wires around the connection portions 113, 123 and are accommodated in the wire-accommodating slots 114, 124. Particularly, the winding mode of the coils on the first single teeth 11 is different from the winding mode of the coils on the second single teeth 12 so that the contour of the coils located on the outer side of the wire-accommodating slots 114 of the first single teeth 11 is different from the contour of the coils located on the outer side of the wire-accommodating slots 124 of the second single teeth 12. In the embodiment shown in FIG. 3, the top and bottom of the contour of the coils located on the outer side of the first single teeth 11 on the left respectively dent inwards and the middle protrudes outwards; the top and bottom of the contour of the coils located on the outer side of the second single teeth 12 on the right respectively protrude outwards and the middle dents inwards. In the present invention, the contour of the coils located on the outer side of the single teeth is, of course, not limited to what is mentioned above. In this way, the contour of the coils located on the outer side of the wire-accommodating slots of the first single teeth 11 matches the contour of the coils located on the outer side of the wire-accommodating slots of the second single teeth 12, that is to say, a close fit between the adjacent first single tooth 11 and second single tooth 12 is allowed to obtain a high space utilization.

The staggered arrangement and the inconsistent profiles of the coils located on the outer side can further increase the slot space factor of a motor. For example, for a given wire-accommodating slot size, the number of turns (88 turns in total) in the embodiment (shown in FIG. 3) can be greater than the number of turns which can be wound (85 turns in total) by use of the technique for splicing single teeth into a circle in the prior art (shown in FIG. 1). That is, after asymmetric arrangements are adopted for adjacent single teeth on the basis of the coils shown in FIG. 1, three more wires can be arranged for each coil and six more wires can be arranged for each wire-accommodating slot.

According to one embodiment, the difference between the winding mode of the coils 13 on the first single teeth 11 and the winding mode of the coils 13 on the second single teeth 12 is only that the winding mode of a plurality of turns of the coils located on the outermost side of the wire-accommodating slots of the first single teeth 11 is different from the winding mode of a plurality of turns of the coils located on the outermost side of the wire-accommodating slots of the second single teeth 12. For example, the numbers marked on the turns of the coils in FIGS. 4 and 5 represent the winding sequence of each turn of the coils. By comparing FIGS. 4 and 5, it can be seen that the positions of the same turn numbers adjacent to the connection portion 113 and 123 are the same, but the positions of the same turn numbers located on the outermost side of the wire-accommodating slots are different. For example, the positions of turn numbers 72, 86 and 87 in FIG. 4 are different from the positions of turn numbers 72, 86 and 87 in FIG. 5. Such an arrangement can be achieved by changing little the winding procedure so that the present invention can be more easily applied to the processing technique of the prior art.

In addition, an insulating layer 15 can be attached onto the slot walls of the wire-accommodating slots 114, 124 of the first single teeth 11 and the second single teeth 12 so that the first single teeth 11 and the second single teeth 12 are electrically insulated from the coils 13 thereon. In addition, as shown in FIG. 3, one or more layers of insulating spacer 14 can be further provided between adjacent first single teeth 11 and second single teeth 12 and insulating spacers can be bent somewhat along the contour of the coils. The length of the insulating spacer 14 is greater than the width W of the slot opening of the wire-accommodating slot and the insulating spacer 14 is made of a flexible material to adapt to the above-mentioned inconsistent contours of the coils located on the outer side. In addition, if varnished wires meeting the electrical insulation requirements are adopted for the coils 13, the above-mentioned insulating layer 15 and insulating spacer 14 can be omitted. Particularly, if the above-mentioned insulating spacer 14 is cancelled, the slot space factor can be further increased.

In another embodiment, the processing method of the above-mentioned stator core 10 mainly comprises: winding coils on a plurality of first single teeth in first winding mode (step 1), winding coils on a plurality of second single teeth in second winding mode (step 2), wherein the first winding mode is different from the second winding mode and the contour of the coils located on the outer side of the first single teeth is different from the contour of the coils located on the outer side of the second single teeth, and splicing first single teeth and second single teeth in sequence in a staggered manner into a circle to form an annular stator core (step 3). In the above-mentioned step, the sequence of steps 1 and 2 is not restricted, that is to say, steps 1 and 2 can be performed simultaneously or step 2 can be performed first.

As discussed above, the difference between the first winding mode and the second winding mode mentioned in steps 1 and 2 is only that the winding mode of a plurality of turns of the coils located on the outer side of the first single teeth is different from the winding mode of a plurality of turns of the coils located on the outer side of the second single teeth.

In addition, when insulating layers need to be attached, insulating layers can be attached onto the slot walls of the wire-accommodating slots of the first single teeth and/or second single teeth before steps 1 and 2 of winding coils. Then, the above-mentioned insulating spacer can be further provided between adjacent first single teeth and second single teeth.

In a word, the stator core provided by the present invention and the processing method can effectively increase the slot space factor of a motor and then improve the power density of the motor. In addition, the implementation of the present invention only requires proper adjustments of the winding procedure of the established winding equipment, without changing the hardware of the winding equipment. Therefore, the implementation cost is low.

It will be appreciated by those skilled in the art that various modifications and variations can be made to the above-mentioned example embodiments of the present invention without departing from the spirit and scope of the present invention. Therefore, the present invention is intended to cover all modifications and variations made to the present invention in the scope of the attached claims and the equivalent technical solutions.

The invention claimed is:

1. A stator core comprising: a plurality of first single teeth; a plurality of second single teeth; and coils, the plurality of first single teeth and the plurality second single teeth being I-shaped and each of the plurality of first single teeth and the plurality of second single teeth including a relatively long side, a relatively short side, a connection portion and a wire-accommodating slot located on two sides of the connection portion, the coils being formed by winding wires around the connection portions and accommodated in the wire-accommodating slots, wherein, the stator core is an annular element formed by splicing first single teeth of the plurality of first single teeth and second single teeth of the plurality of second single teeth, in sequence, in a staggered manner into a circle, wherein, a winding mode of the coils on the plurality of first single teeth is different from a winding mode of the coils on the plurality of second single teeth so that a contour of the coils located on an outer side of the wire-accommodating slots of the plurality of first single teeth is different from a contour of the coils located on an outer side of the wire-accommodating slots of the plurality of second single teeth, wherein, the contour of the coils on the outer sides of the plurality of first single teeth are mirror images of one another and the contour of the coils on the outer sides of the plurality of second single teeth are mirror images of one another; and wherein, the contour is non-linear, wherein, a number of turns of a first single tooth is the same as a number of turns of a second single tooth, wherein the contour of the coils located on the outer side of the wire-accommodating slots of the plurality of first single teeth matches the contour of the coils located on the outer side of the wire-accommodating slots of the plurality of second single teeth.

2. The stator core of claim 1, wherein a difference between the winding mode of the coils on the plurality of first single teeth and the winding mode of the coils on the plurality of second single teeth is only that the winding mode of a plurality of turns of the coils located on the outermost side of the wire-accommodating slots of the plurality of first single teeth is different from the winding mode of a plurality of turns of the coils located on the outermost side of the wire-accommodating slots of the plurality of second single teeth.

3. The stator core of claim 1, wherein an insulating layer is attached onto slot walls of the wire-accommodating slots of the plurality of first single teeth and the plurality of second single teeth, so that the plurality of first single teeth and the plurality of second single teeth are respectively electrically insulated from respective coils thereon.

4. The stator of claim 3, wherein an insulating spacer is provided between adjacent ones of the plurality of first single teeth and plurality of second single teeth, a length of the insulating spacer being relatively greater than a width of the slot opening of the wire-accommodating slots, and the insulating spacer being made of a flexible material.

5. The stator core of claim 1, wherein the plurality of first single teeth and the plurality of second single teeth are formed by laminating a plurality of layers of silicon steel sheets.

6. A processing method of a stator core, comprising: winding coils on a plurality of first single teeth in a first winding mode; winding coils on a plurality of second single teeth in a second winding mode, the first winding mode being different from the second winding mode and a contour of the coils located on an outer side of the plurality of first single teeth being different from a contour of the coils located on an outer side of the plurality of second single teeth such that the contour of the coils on the outer sides of the plurality of first single teeth are mirror images of one another and the contour of the coils on the outer sides of the plurality of second single teeth are mirror images of one another, wherein the contour of the coils located on the outer side of the wire-accommodating slots of the plurality of first single teeth matches the contour of the coils located on the outer side of the wire-accommodating slots of the plurality of second single teeth; wherein, the contour is non-linear and splicing first single teeth of the plurality of first single teeth and second single teeth of the plurality of second single teeth, in sequence, in a staggered manner into a circle to form an annular stator core, wherein, a number of turns of a first single tooth is the same as a number of turns of a second single tooth.

7. The processing method of claim 6, wherein the difference between the first winding mode and the second winding mode is only that a winding mode of a plurality of turns of the coils located on the outer side of the plurality of first single teeth is different from the winding mode of a plurality of turns of the coils located on the outer side of the plurality of second single teeth.

8. The processing method of claim 7, wherein, before the winding of the coils on the plurality of first single teeth in the first winding mode, the processing method further comprises:
attaching an insulating layer onto the slot walls of the wire-accommodating slots of at least one of the plurality of first single teeth and the plurality of second single teeth.

9. The processing method of claim 7, wherein the splicing of the of the plurality of first single teeth and second single teeth of the plurality of second single teeth, in sequence, in the staggered manner into the circle to form the annular stator core, further comprises:
providing an insulating spacer between adjacent first single teeth, of the plurality of first teeth, and second single teeth, of the plurality of second teeth, wherein a length of the insulating spacer is relatively greater than a width of the slot opening of the wire-accommodating slots of the first single teeth and second single teeth and the insulating spacer is made of a flexible material.

10. The processing method of claim 6, wherein, before the winding of the coils on the plurality of first single teeth in the first winding mode, the processing method further comprises:
attaching an insulating layer onto slot walls of the wire-accommodating slots of at least one of the plurality of first single teeth and the plurality of second single teeth.

11. The processing method of claim 6, wherein the splicing of the plurality of first single teeth and second single teeth of the plurality of second single teeth, in sequence, in the staggered manner into the circle to form the annular stator core, further comprises:
providing an insulating spacer between adjacent first single teeth, of the plurality of first teeth, and second single teeth, of the plurality of second teeth, wherein a length of the insulating spacer is relatively greater than a width of the slot opening of the wire-accommodating slots of the first single teeth and second single teeth and the insulating spacer is made of a flexible material.

* * * * *